(12) United States Patent
Gripemark

(10) Patent No.: US 7,032,717 B2
(45) Date of Patent: Apr. 25, 2006

(54) SLEEVE FOR A DISC BRAKE

(75) Inventor: Joakim Gripemark, Helsingborg (SE)

(73) Assignee: Haldex Brake Products AB, (SE)

( * ) Notice: Subject to any disclaimer, the term of this patent is extended or adjusted under 35 U.S.C. 154(b) by 0 days.

(21) Appl. No.: 10/750,399

(22) Filed: Dec. 31, 2003

(65) Prior Publication Data

US 2004/0216964 A1 Nov. 4, 2004

Related U.S. Application Data

(63) Continuation of application No. PCT/SE02/01294, filed on Jul. 1, 2002.

(30) Foreign Application Priority Data

Jul. 2, 2001 (SE) .................................... 0102350

(51) Int. Cl.
*B60T 1/06* (2006.01)
(52) U.S. Cl. ................................................... 188/18 A
(58) Field of Classification Search .............. 188/18 A, 188/218 XL, 264 R, 71.5, 73.46; 301/6.8, 301/6.1, 105.1; 384/544, 537; 192/70.12, 192/70.2
See application file for complete search history.

(56) References Cited

U.S. PATENT DOCUMENTS

| | | | | |
|---|---|---|---|---|
| 3,705,641 A | * | 12/1972 | Brooks et al. | 188/73.46 |
| 4,844,206 A | * | 7/1989 | Casey | 188/18 A |
| 5,205,380 A | | 4/1993 | Paquet et al. | 188/18 A |
| 5,507,367 A | * | 4/1996 | Dagh et al. | 188/18 A |
| 5,540,303 A | * | 7/1996 | Bodin et al. | 188/18 A |
| 5,568,846 A | * | 10/1996 | Dagh et al. | 188/218 XL |
| 6,330,937 B1 | * | 12/2001 | Dagh et al. | 188/18 A |
| 6,705,434 B1 | * | 3/2004 | Bunker | 188/18 A |
| 6,705,437 B1 | * | 3/2004 | Severinsson et al. | 188/73.32 |
| 2004/0050632 A1 | * | 3/2004 | Gotti et al. | 188/71.1 |
| 2004/0124048 A1 | * | 7/2004 | Sandberg et al. | 188/218 XL |

FOREIGN PATENT DOCUMENTS

| | | |
|---|---|---|
| DE | 196 28 331 A1 | 1/1998 |
| DE | 196 42 166 A1 | 4/1998 |
| WO | WO 93/14947 * | 8/1993 |
| WO | WO 02/073061 A1 * | 9/2002 |
| WO | WO 03/004895 A1 * | 1/2003 |

OTHER PUBLICATIONS

Translation for STIC for DE19628331.*
Translation for STIC for DE19642166.*

* cited by examiner

*Primary Examiner*—Melanie Torres
(74) *Attorney, Agent, or Firm*—St Onge Steward Johnston & Reens LLC

(57) ABSTRACT

The present invention concerns a sleeve for a disc brake. The sleeve is furnished with splines (4, 5) on the outer periphery for co-operation with one or more brake discs. The sleeve is to be placed on a wheel axle and is attached to a wheel flange 1 by means of a number of bolts 3 received in threaded openings of the sleeve. A groove is arranged in the sleeve, which groove is parallel with the outer periphery of the sleeve and is open at one end. The sleeve has a generally straight outer periphery allowing the brake disc(s) to be slid off and slid onto the sleeve in any axial direction.

6 Claims, 4 Drawing Sheets

SLEEVE FOR A DISC BRAKE

This application is a continuation of pending International Patent Application No. PCT/SE02/01294 filed Jul. 1, 2002 which designates the United States and claims priority of pending Swedish Application No. 0102350-0 filed Jul. 2, 2001.

FIELD OF INVENTION

The present invention concerns a sleeve for use at a disc brake. The invention is developed for use with brakes for trucks, lorries, busses, trailers or the like, but a person skilled in the art realises that it may be used for any kind of vehicle.

BACKGROUND OF INVENTION

The present invention is intended for use with disc brakes having a fixed caliper. In disc brakes having a fixed caliper one or more brake discs are normally arranged rotatably fixed but axially slideable in relation to the wheel axle. The brake disc is connected to the wheel axle by means of intermediary parts. The intermediary parts are also connected to the wheel flange. In the prior art the number of intermediary parts is often rather high. In view of reducing the complexity and the size of the brake there is a need for a reduced number of intermediary parts. The present invention is directed to said intermediary parts between the brake disc and the wheel axle.

Regarding maintenance one object is that it should be as few steps as possible to replace a brake disc. In the prior art the intermediary parts often comprise a flange disc or a part partly formed as a disc to be attached to the actual wheel flange. If the brake disc is to be replaced the flange disc or the part formed as a disc has to be removed before the disc could be replaced. Thus, one has to go through several steps when replacing a disc brake according to the prior art.

A further problem is that the heat produced during breaking may be quite substantial. Thus, there is a need for means at the intermediary parts, to protect different parts of the brake and axle against overheating.

SUMMARY OF INVENTION

One object of the present invention is to arrange the intermediary parts in such a way that a cooling effect is created. The cooling effect is mainly to protect bearing means being part of the intermediary parts. It may also be necessary to protect other parts, such as sensors against overheating.

The above object is met by a sleeve for a disc brake, which sleeve has means for co-operation with at least one brake disc. The sleeve is to be received on a wheel axle. Furthermore, the sleeve has a groove, the main orientation of which being parallel with the outer periphery of the sleeve.

A further object of the present invention is to facilitate maintenance of the disc brakes and especially to facilitate replacement of the brake disc.

Still a further object of the present invention is to reduce the number of parts used for connecting, directly or indirectly, a brake disc to a wheel axle and wheel flange, respectively.

The integrated sleeve and hub of the present invention reduce the number of intermediary parts between the wheel axle and the wheel flange from four to two.

Further objects and advantages of the present invention will be obvious for a person skilled in the art when reading the detailed description below of a preferred embodiment.

BRIEF DESCRIPTION OF DRAWINGS

The present invention will be described more closely below with reference to a preferred embodiment, by way of an example, and with further reference to the enclosed drawings. In the drawings.

DETAILED DESCRIPTION OF A PREFERRED EMBODIMENT

Figure 1:
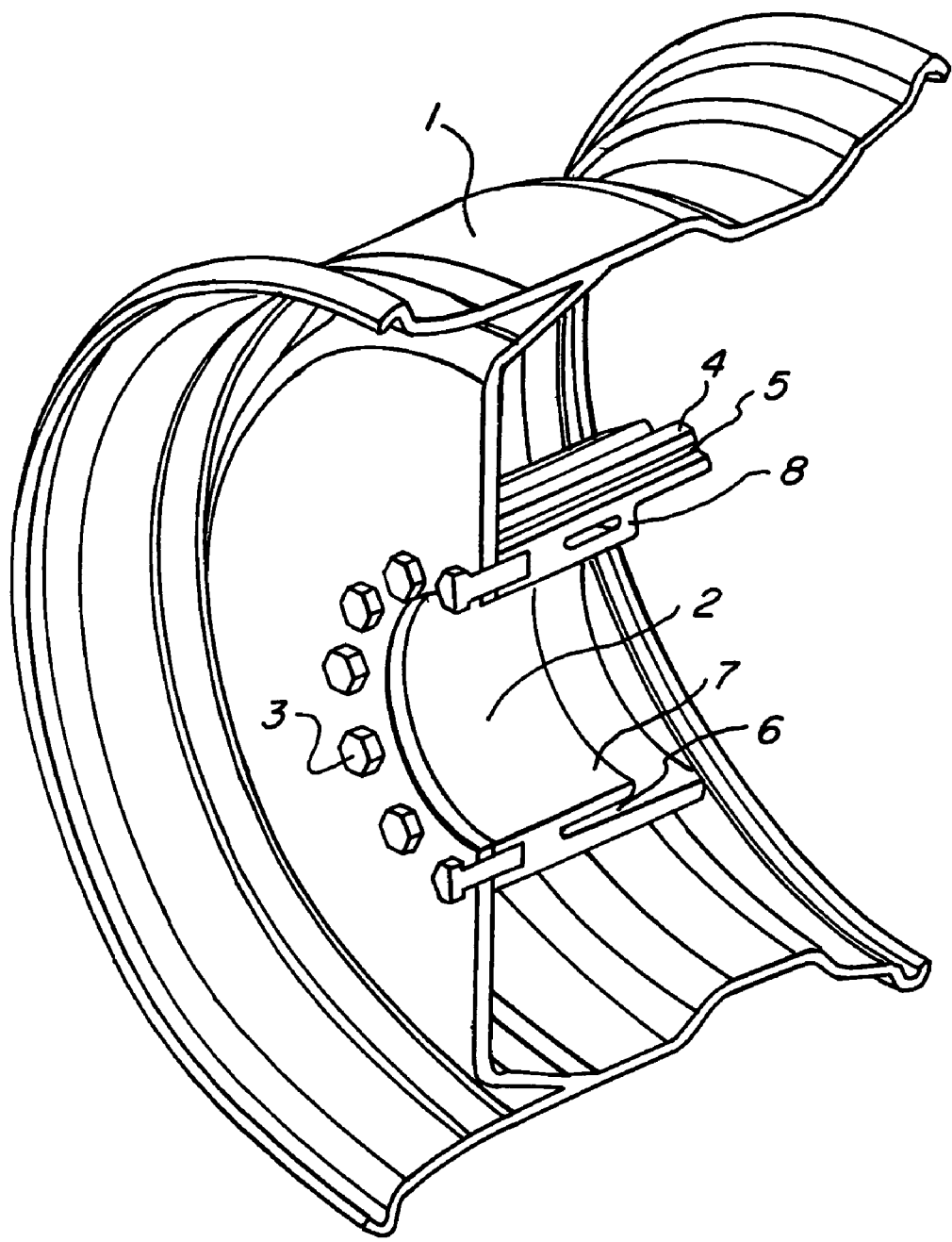
FIG. 1 is a perspective view, partly in section of a sleeve according to the present invention fixed to a wheel flange.
Figure 2:
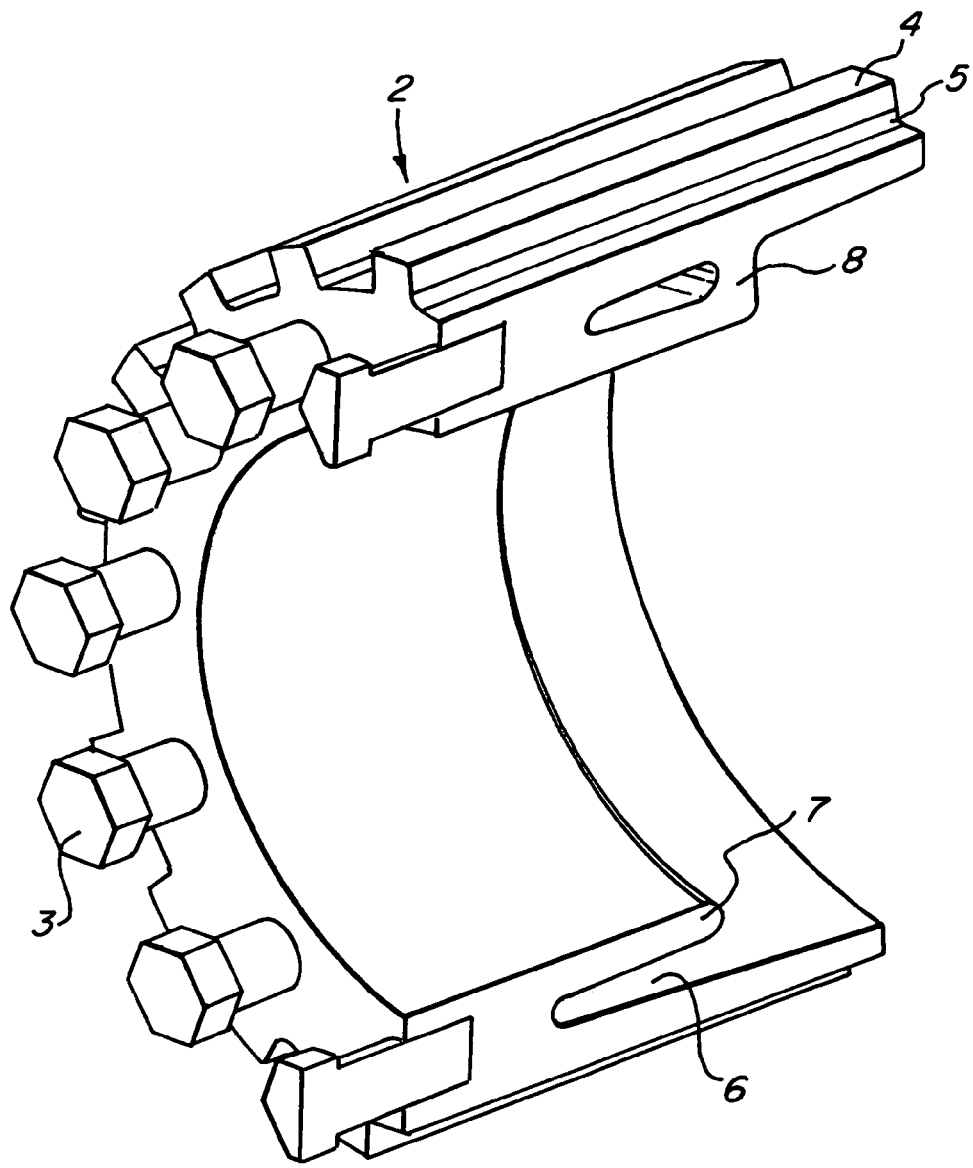
FIG. 2 is a perspective view of the sleeve of FIG. 1.
Figure 3:
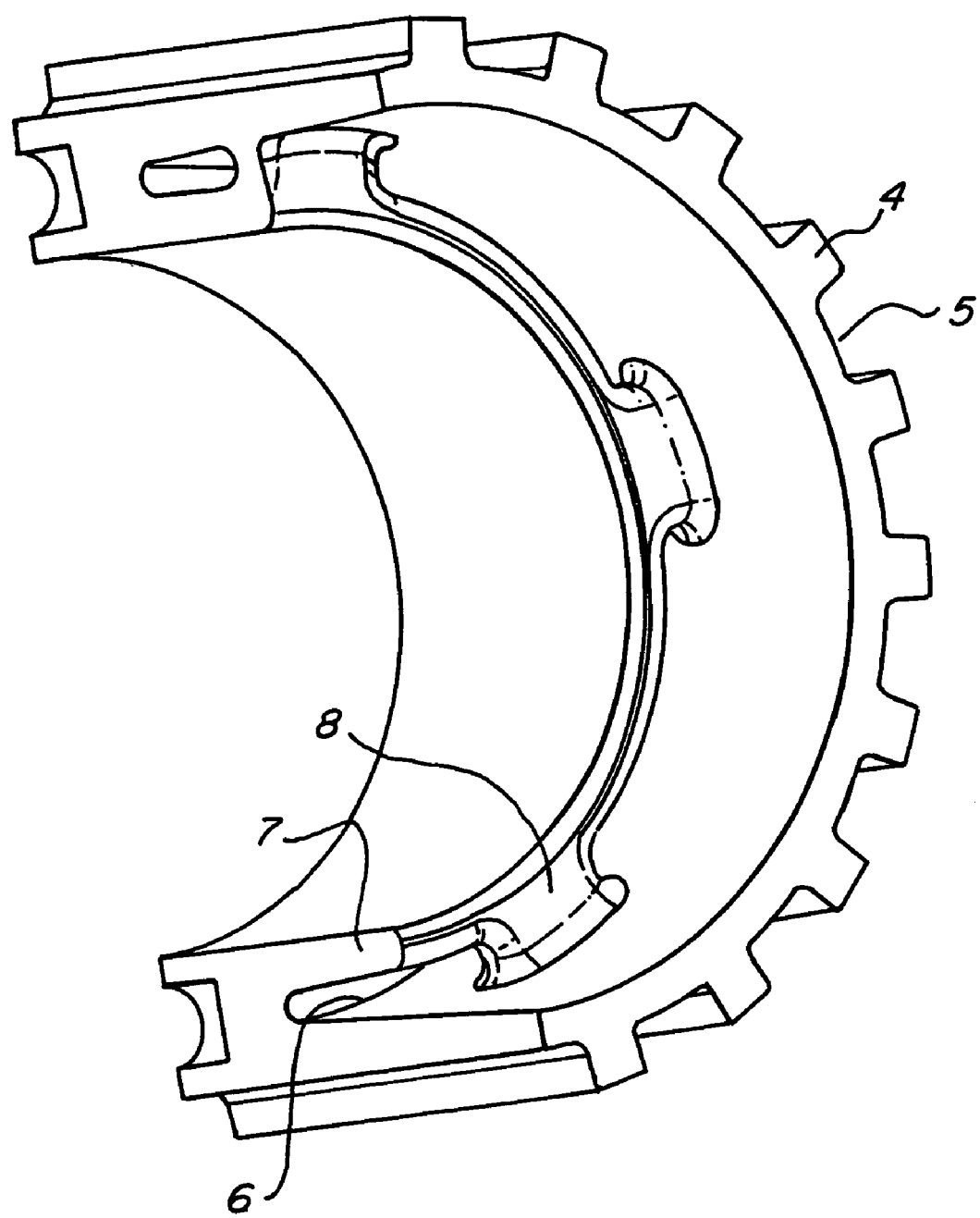
FIG. 3 is a perspective view, partly in section, of the sleeve of FIGS. 1 and 2 taken from the opposite direction.
Figure 4:
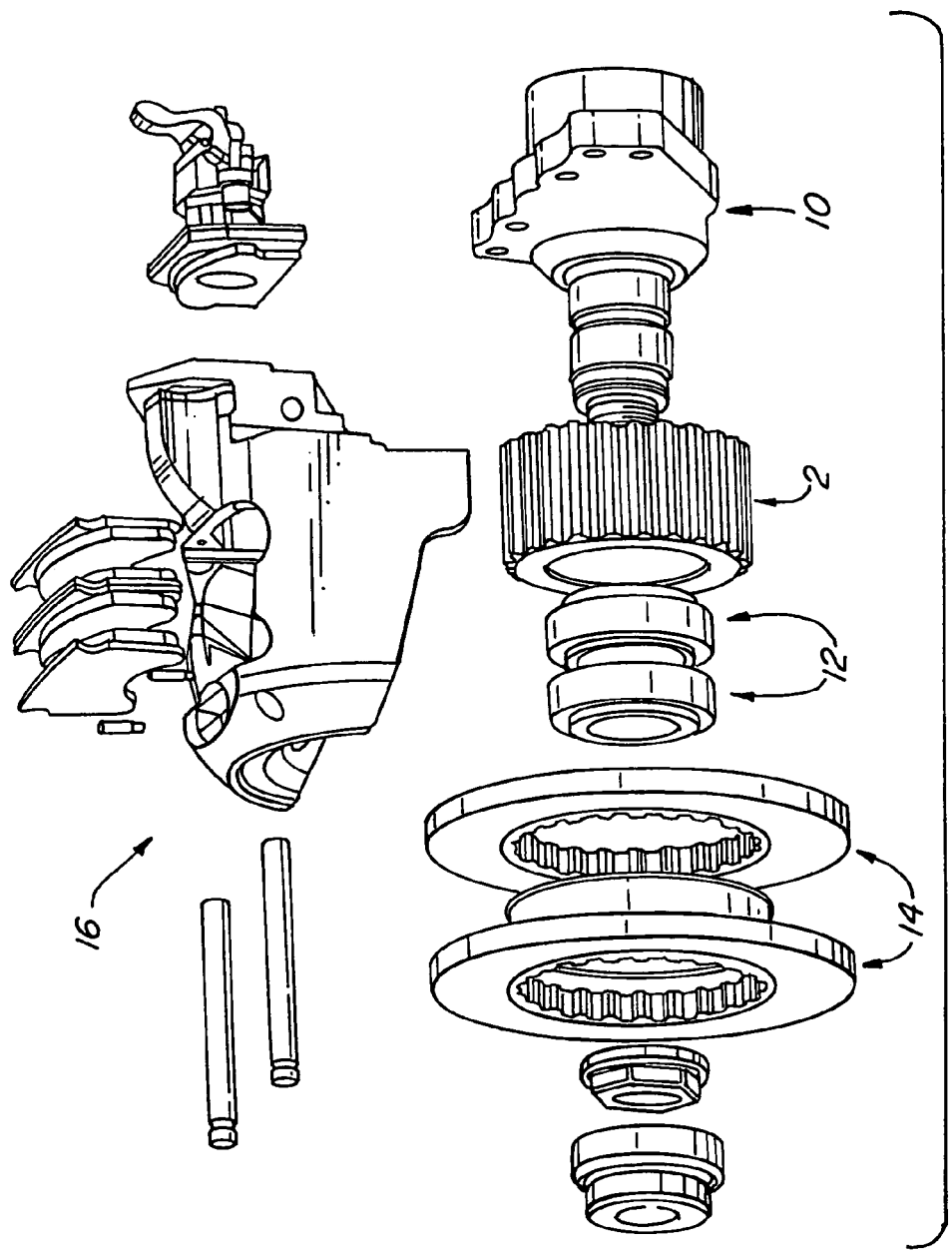
FIG. 4 is an exploded perspective view illustrating a disc brake system with the sleeve of the invention.

The integrated sleeve 2 of the present invention corresponds to a sleeve and hub, normally present at disc brakes of the prior art.

According to the present invention the integrated sleeve 2 is attached directly to a wheel flange 1. Thus, the wheel flange 1 has to be made strong and stiff enough to carry the sleeve 2 of the disc brake. In the shown embodiment the sleeve 2 is attached to the wheel flange 1 by means of a number of bolts 3. In the shown embodiment there are twelve bolts 3, but a person skilled in the art realises that the number of bolts may be different in other embodiments. The bolts 3 are received in threaded openings of the sleeve 2. The threaded openings of the sleeve 2 are arranged on the end of the sleeve 2 intended for contact with the wheel flange 1. The threaded openings of the sleeve 2 are adapted to corresponding openings in the wheel flange 1.

The integrated sleeve 2 is to be placed on the wheel axle 10. The inner periphery of the sleeve 2 is received on the wheel axle 10 by way of a bearing means 12.

The sleeve 2 is to support one or more brake discs 14 by way of means for co-operation with corresponding means of the brake disc(s). In the shown embodiment the means for co-operation with the brake disc(s) is splines. The splines have the form of raised portions 4 and grooves 5 arranged on the outer periphery of the sleeve 2. The actual cross-sectional form of the splines may vary between different embodiments. The splines of the sleeve 2 are to co-operate with corresponding parts of the brake disc(s). The brake disc(s) is received rotatably fixed to the sleeve 2 but moveable in an axial direction for the brake operation in association with a fixed calliper 16.

The outer periphery of the raised portions 4 and grooves 5, forming the splines of the sleeve 2, is straight and parallel with the main extent of the wheel axle 10. Expressed differently the sleeve 2 has a generally tubular form. The outer form of the sleeve 2 permits a brake disc to be slid off or onto the sleeve 2 in any axial direction.

A groove 6 is arranged in the sleeve 2, which groove is open towards one end of the sleeve 2. The groove 6 is parallel with the outer periphery of the sleeve 2 and is open in the direction away from the wheel flange 1. Thus, the groove 6 does not extend all the way to the end of the sleeve 2 to be attached to the wheel flange 1. By the groove 6 an inner wall 7 is formed at the inner periphery of the sleeve 2. The inner wall 7 has a shorter axial extension directed away from the wheel flange 1 than the outer wall of the sleeve 2.

At the open end of the groove 6, i.e. the end directed away from the wheel flange 1, a number of bridges 8 connect the inner wall 7 to the outer wall of the sleeve 2. The bridges 8 have a stiffening effect. The purpose of the groove 6 is to protect the bearing means placed between the inner wall 7 of the sleeve and the wheel axle against overheating. It is especially the grease of the bearing means that is in the risk of being overheated.

By the form and placement of the integrated sleeve 2 it is fairly simple to replace the brake disc. To replace the brake disc the bolts 3 are first unscrewed and the wheel with the wheel flange 1 is lifted off. When the wheel has been lifted off the brake disc(s) may be slid on the splines 4, 5 of the sleeve 2 out off the sleeve 2. Then a new brake disc may be slid back onto the splines 4, 5 of the sleeve 2 and the wheel flange 1 is then fixed to the sleeve 2.

What is claimed is:

1. A sleeve for a disc brake, comprising a sleeve adapted to be placed on a wheel axle and coupled to a wheel flange, wherein at least one brake disc is moveable in an axial direction on the sleeve, the sleeve having means for co-operation with at least one brake disc, the sleeve further having a groove forming inner and outer walls of the sleeve, the main orientation of said groove being parallel with the outer periphery of the sleeve, the inner wall of the sleeve having a shorter axial extension away from the wheel flange than the outer wall of the sleeve, wherein the sleeve forms an integrated sleeve and hub and has a generally tubular form, and wherein the outer periphery of the sleeve is generally straight and parallel with the main extent of the wheel axle, such that a brake disc is slidable on and off the sleeve in any axial direction.

2. The sleeve of claim 1, further comprising a plurality of bridges connecting the inner wall of the sleeve to the outer wall of the sleeve.

3. The sleeve of claim 2, wherein the groove is open in the direction directed away from the wheel flange.

4. The sleeve of claim 2, wherein the inner wall is parallel with the outer periphery of the sleeve.

5. The sleeve of claim 2, wherein the sleeve has threaded openings for receiving bolts, used to securely screw the sleeve onto the wheel flange, and the wheel flange has openings corresponding to the threaded openings of the sleeve.

6. The sleeve of claim 2, wherein the means for co-operation with the brake disc comprises splines.

\* \* \* \* \*